Feb. 10, 1925.
C. K. MacDONALD
1,525,457
MEANS FOR CONTROLLING THE STARTING MECHANISM OF MACHINES
Filed April 29, 1918
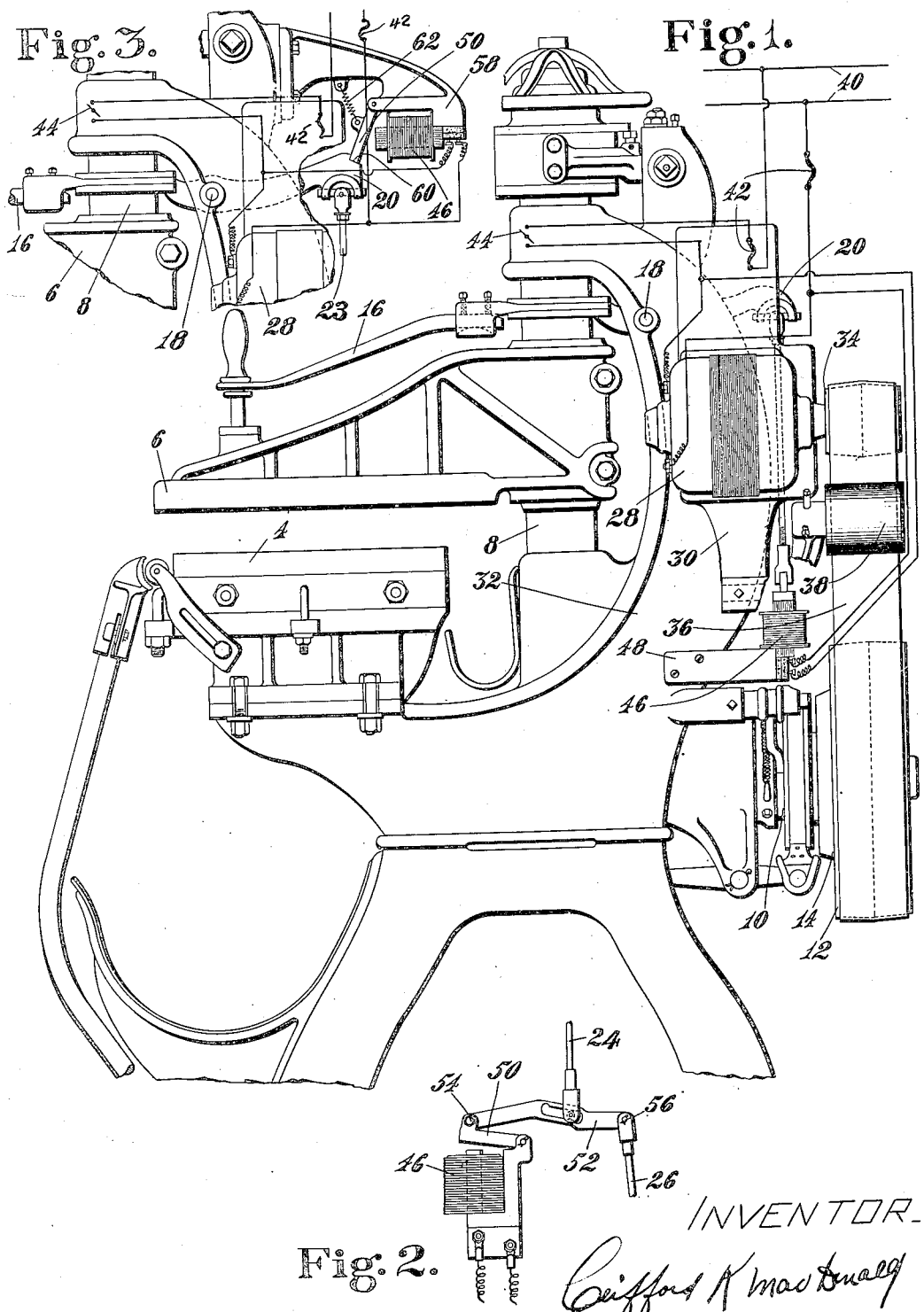
INVENTOR
Clifford K MacDonald Patented Feb. 10, 1925.

1,525,457

UNITED STATES PATENT OFFICE.

CLIFFORD K. MacDONALD, OF BROCKTON, MASSACHUSETTS, ASSIGNOR TO UNITED SHOE MACHINERY CORPORATION, OF PATERSON, NEW JERSEY, A CORPORATION OF NEW JERSEY.

MEANS FOR CONTROLLING THE STARTING MECHANISM OF MACHINES.

Application filed April 29, 1918. Serial No. 231,297.

*To all whom it may concern:*

Be it known that I, CLIFFORD K. MACDON-ALD, a citizen of the United States, residing at Brockton, in the county of Plymouth and State of Massachusetts, have invented certain Improvements in Means for Controlling the Starting Mechanisms of Machines, of which the following description, in connection with the accompanying drawings, is a specification, like reference characters on the drawings indicating like parts in the several figures.

This invention relates to devices for controlling the operation of the starting members or mechanisms of various classes of machines and more particularly to devices for preventing the actuation of the starting members or mechanisms accidentlly or inadvertently.

It is now common practice to furnish machines with individual motors, thus making it possible to set up and run a machine independently of shafting wherever electrical power is obtainable. In many of these machines some manually controlled member or mechanism is provided for the purpose of starting the machine, the said member or mechanism being in some cases operative both for starting and stopping the machine. A construction almost universally employed in machines consists of a main shaft, a continuously running driving pulley loosely mounted on the shaft, and a mechanism usually in the form of a clutch for connecting the driving or power pulley and the shaft. In such a construction, the clutch is rendered operative by the manually controlled member or mechanism above mentioned. As a matter of economy and efficiency, the electrical motor provided with the machine is often selected with the idea of furnishing just sufficient power, and no more than is sufficient, to run the machine in its normal operation. If, for example, the starting member be actuated to trip the clutch while the motor is standing idle, too heavy a load may be provided for the motor, upon an attempt to start the same. Then when the motor circuit is closed, the rotatable part of the motor, i. e., the armature, is held from turning. Under such circumstances the motor may promptly burn out, or such other serious injury to the motor may take place as to put the machine out of commission for a considerable period of time through lack of power to run it. In any case, there is an appreciable loss of time as the operative must open the switch of the motor circuit, walk around to the back of the machine, and turn the main shaft over by hand until the clutch mechanism returns to normal rest position. These operations would consume several minutes of valuable time. If the motor circuit be closed as the first step in starting the machine, the motor will promptly start turning the loose pulley on the main shaft, and then the starting member or mechanism may be actuated to cause the tripping of the clutch and thus effect connection of the pulley and shaft and operation of the machine.

It is an object of this invention, therefore, to provide improved means for controlling the starting members or mechanisms of machines, which means will have a wide range of usefulness. Preferably, the said means is so constructed and arranged as to prevent all or any effective operation of the starting member or mechanism of a motor-driven machine while the motor is not running. In a practical embodiment of the invention, an electro-magnet, arranged to be energized and deenergized simultaneously with the motor, is constructed and arranged to exercise direct control of the starting member or mechanism so that the latter cannot be accidentally or inadvertently actuated while the motor is at rest.

From another viewpoint the invention resides in an organization in which a switch in an electrical circuit controls not only the motor which furnishes the driving power but also a lock for the starting mechanism of the machine.

Other objects of the invention will be apparent from a consideration of the following description and claims in connection with the accompanying drawings, in which,—

Fig. 1 is a view in side elevation of a clicking machine showing the invention applied thereto;

Fig. 2 is a detail showing the operative connection between the electro-magnet and a portion of the starting machism, and Fig. 3 is a detail view showing a modification of the invention.

For convenience in illustration, the invention is shown applied to a clicking machine, the latter comprising a cutting bed 4 upon which the material to be cut is placed and a presser member 6 which is operative to force the die through the material on the cutting bed. The presser member is mounted fixedly upon a post 8 arranged to be reciprocated from the main shaft 10 having loosely mounted thereon a driving pulley 12 within the flanged portion 14 of which is located the clutch mechanism for operatively connecting the driving pulley with the shaft. When it is desired to throw the machine into operation, the workman depresses the starting lever 16 which is pivoted at 18 and has pivotally connected to its rear end 20 a rod attached at its lower end to the lever which trips the clutch. Ordinarily, this rod is an integral member which extends directly from the rear end of the starting member to the lever which trips the clutch mechanism, this being a well known construction as shown in the patent to Eaton, No. 1,131,686, granted March 16, 1915. In the present embodiment of the invention, however, this rod has been constructed in two parts, 24 and 26, as disclosed in Fig. 2, the reason for which will be made clear later in this description.

In order to furnish power for running the machine, an electric motor 28 is mounted upon a bracket 30 extending out from the frame 32 of the machine, the arrangement being such that the motor shaft is arranged above and parallel with the main shaft 10 of the machine. Carried by the motor shaft is a pulley 34 about which passes the belt 36 which extends to and drives the loose pulley 12 on the main shaft, a belt tensioning roll 38 being provided to yieldingly press upon the belt properly to tension the same. Current for the motor is taken from the line wires 40, fusible conductors 42 being provided in the motor circuit to prevent injury to the motor. When the switch 44 is closed, the motor becomes operative to turn the driving pulley 12 on the main shaft of the machine, the said pulley being effective also as a fly wheel. After the switch has been closed, operation of the machine may be secured at any time by manipulation of the starting lever 16. As stated above, the motor which is provided with each machine is selected to furnish sufficient power to run the machine under normal conditions. If, for instance, the starting lever 16 be depressed while the motor is idle, too heavy a load is provided for the motor, the result being that the armature of the motor is prevented from turning. Under such conditions serious injury to the motor may result even to the extent of burning it out. When the motor becomes stalled under the conditions described, the operative will find it necessary to open the switch in the motor circuit and to proceed to turn the main shaft over by hand until the clutch mecha- nism comes to its proper rest position. In order to prevent the accidental or inadvertent operation of the starting mechanism when the motor is idle, there is provided in the present embodiment of the invention, an electro-magnet in a circuit connected with the motor circuit so that magnet and motor are simultaneously energized and deenergized. This magnet 46 is located upon a bracket 48 extending rearwardly from the frame of the machine and has an armature 50 pivotally connected to a slotted member 52, with which member the two parts, 24 and 26, of the rod are pivotally connected. The operation of this part of the device is as follows: When the switch 44 is closed, thus starting the motor in operation, the magnet 46 is at the same time energized with the result that the armature 50 is drawn downwardly and held fixedly in position against the end of the armature. If the starting lever 16 be now depressed, member 52 is pulled upwardly turning about the pin 54 as a fulcrum with the result that the clutch mechanism is tripped, through upward movement of rod 26, to connect the driving pulley to the main shaft, thus causing the machine to operate. On the other hand, if the starting lever 16 be depressed while the motor is idle and consequently at a time when the magnet 46 is de-energized, depression of the starting lever 16 will cause member 52 to move upwardly as before with this change: that whereas under the conditions previously described, it turned about the fulcrum pin 54, it now turns about the pin 56 as a fulcrum, the freely movable armature 50 being lifted away from the magnet. This movement takes place because of the fact that the armature 50 and that part of the member 52 to the left of the rod 24 in Fig. 2 are very much lighter than the clutch parts which would have to be lifted by the rod 26 at the right of rod 24 in Fig. 2. Hence the clutch parts remain stationary while the armature 50 is free to move. By the mechanism thus described, the clutch mechanism cannot be tripped by depression of the starting lever 16 when the motor is idle or, in other words, when the motor circuit is open.

In the modification shown in Fig. 3 of the drawings, the electro-magnet 46 is mounted on a bracket 58 at the upper part of the machine frame just above and to the right of the rear end 20 of the starting lever 16. The magnet is so located that its armature 50 may serve as a lock or latch to engage a shoulder 60 on the rear end 20 of the starting lever to prevent depression of the forward end of this lever, the armature being held in latching position by means of a spring 62. When the operative desires to operate the machine, he must first close the switch 44 inasmuch as this not only starts the motor but energizes the electro-magnet, thus causing withdrawal of the armature 50 from its position over the end 20 of the starting lever which is thus unlocked and may be depressed to start the machine, it being understood that, in this embodiment of the invention, the rear end 20 of the starting lever is connected by a single integral member 23 with the clutch to cause tripping of the same upon depression of the starting member 16.

Having thus described the invention, what I claim as new and desire to secure by Letters Patent of the United States is:—

1. In a machine of the class described, a driven member, a shaft, mechanism for starting the machine in operation by operatively connecting said driven member to said shaft, means for driving said member, means automatically operative for locking the starting mechanism against effective manipulation by the operator, and means under the control of the operator for moving the locking means to inoperative position so that the machine may be started in operation.

2. In a machine of the class described, an operating shaft, an electric motor for driving said shaft comprising operative connections between said motor and shaft, mechanism for starting the machine in operation comprising manually operable means for controlling said connections, and electric means, arranged to be energized and deenergized simultaneously with the motor, for locking the starting mechanism against actuation until the motor circuit is closed.

3. In a machine of the class described, an operating shaft, a driving pulley loosely mounted on the shaft, an electric motor for driving the pulley, mechanically operated clutch mechanism for connecting the pulley and shaft, mechanism comprising a manually operable member having mechanical connections with the clutch for tripping the clutch and thus starting the machine in operation, and electric means for controlling the manually operable member of the tripping mechanism in such manner that the latter is inoperative to trip the clutch mechanism until the motor circuit is closed.

4. In a machine of the class described, an operating shaft, a driving pulley loosely mounted on the shaft, an electric motor for driving the pulley, mechanically operated clutch mechanism for connecting the pulley and shaft, mechanism comprising a manually operable member having lever and rod connections with the clutch for tripping the clutch and thus starting the machine in operation, and means for preventing movement of the manually operable member to cause tripping of the clutch mechanism through the starting mechanism until the motor circuit is closed.

5. In a machine of the class described, an operating shaft, a driving pulley loosely mounted on the shaft, an electric motor for driving the pulley, clutch mechanism for connecting the pulley and shaft, mechanism for tripping the clutch and thus starting the machine in operation, means for locking the tripping or starting mechanism against effective manipulation by the operator, and a single means for controlling the motor and the locking means.

6. In a machine of the class described, an operating shaft, a driving pulley loosely mounted on the shaft, an electric motor for driving the pulley, clutch mechanism for connecting the pulley and shaft, mechanism for tripping the clutch and thus starting the machine in operation, means movable to lock and unlock said mechanism, and an electro-magnet for controlling the locking means to prevent effective manipulation by the operator of the tripping or starting mechanism while the motor is not energized.

7. In a machine of the class described, an operating shaft, a driving pulley loosely mounted on the shaft, an electric motor for driving the pulley, clutch mechanism for connecting the pulley and shaft, mechanism for tripping the clutch and thus starting the machine in operation, and a magnet having an armature constructed and arranged to lock the tripping or starting mechanism against actuation until the motor circuit is closed.

8. In a machine of the class described, an operating shaft, a pulley for driving the shaft, an electric motor for driving the pulley, clutch mechanism for operatively connecting the pulley and shaft, a lever for tripping the clutch and thus starting the machine in operation, a member for locking the lever against tripping movement, and a magnet, in a circuit connected with the motor circuit, for moving the locking member to inoperative position simultaneously with the starting of the motor.

9. In a machine of the class described, an operating shaft, a pulley for driving the shaft, an electric motor for driving the pulley, a switch in the motor circuit for controlling the motor, a clutch for operatively connecting the pulley and shaft, manually operable starting means for controlling the clutch, and a member for locking the starting means against actuation also controlled from said switch.

10. In a machine of the class described, an operating shaft, a power pulley for driving the shaft, an electric motor for driving the pulley, a switch in the motor circuit for controlling the motor, clutch mechanism for operatively connecting the pulley and shaft, a lever for tripping the clutch and thus starting the machine in operation, and a member controlled by the switch for locking the lever against actuation until the motor circuit is closed whereupon the member is rendered inoperative to lock the lever.

11. In a machine of the class described, an operating shaft, a driving pulley operative as a fly wheel and loosely mounted on the shaft, an electric motor for driving the fly wheel, a switch in the motor circuit for controlling the motor, clutch mechanism for operatively connecting the fly wheel to the shaft, a lever for tripping the clutch and thus starting the machine in operation, and a member also controlled by the switch for preventing effective manipulation of the lever by the operator while the motor is not energized.

12. In a machine of the class described, co-operating presser members for operating upon work, a shaft for causing pressure applying operations of the presser members, a fly wheel on the shaft, a clutch between the fly wheel and the shaft, an electric motor for driving the fly wheel, a lever for tripping the clutch and thus causing operation of the presser members, and electrically controlled means connected to the motor circuit for locking the lever against effective manipulation by the operator while the motor is not energized.

13. In a machine of the class described, presser members relatively movable with respect to each other, a shaft for moving one of the presser members, a pulley for driving the shaft, an electric motor for driving the pulley, a clutch for operatively connecting the pulley and shaft, a lever for tripping the clutch, a magnet in a circuit connected with the motor circuit, and a member for locking the lever against actuation arranged to be controlled by the magnet, the arrangement being such that the lever cannot be actuated to connect the pulley and shaft until the motor circuit is closed.

14. In a machine provided with an operating shaft, a driving pulley loosely mounted on the shaft, an electric motor for driving the pulley, clutch mechanism for connecting the pulley and shaft, and mechanism for tripping the clutch operative whether the machine be in operation or at rest, the combination of said tripping mechanism with electric means for controlling the tripping mechanism so that the latter may be effectively operated only after the motor has been energized.

15. In a machine of the class described, an operating shaft, a driving pulley loosely mounted on the shaft, a motor for driving the pulley, clutch mechanism for connecting the pulley and shaft, mechanism for tripping the clutch and thus starting the machine in operation, a member for positively locking and for unlocking the tripping mechanism and a manually operable member for controlling both the locking member and the motor.

16. In a machine of the class described, an operating shaft, a driving pulley loosely mounted on the shaft, a motor for driving the pulley, clutch mechanism for connecting the pulley and shaft, mechanism for tripping the clutch and thus starting the machine in operation, a member automatically operative for locking and unlocking the tripping mechanism and a member separate from the tripping mechanism for controlling the motor and the locking member.

17. In a machine of the class described, an operating shaft, a driving pulley loosely mounted on the shaft, a motor for driving the pulley, clutch mechanism for connecting the pulley and shaft, mechanism for tripping the clutch to start the machine in operation, a member for locking the tripping mechanism against effective manipulation by the operator, and a single member manually operable for starting the motor and for simultaneously effecting the withdrawal of the locking member.

18. In a machine of the class described, an operating shaft, a driving pulley loosely mounted on the shaft, an electric motor for driving the pulley, clutch mechanism for connecting the pulley and shaft, a lever for tripping the clutch to start the machine in operation, a member for locking the lever against effective manipulation by the operator, and a single member manually operable for closing the motor circuit to start the motor and for simultaneously effecting the withdrawal of the locking means.

19. In an electric-motor-driven machine, a clutch for the machine, a shaft and a driving member adapted to be connected by the clutch, a motor for operating the driving member, a latch normally operative for locking the clutch against operation, and means comprising a member under the control of the operator for moving the latch to inoperative position and for starting and stopping the motor.

20. In a machine of the class described, an operating shaft, a driving pulley loosely mounted on the shaft, an electric motor for driving the pulley, clutch mechanism for connecting the pulley and shaft, a member for tripping the clutch and thus starting the machine in operation, and a latch for preventing operative movement of said member until the motor circuit is closed.

In testimony whereof I have signed my name to this specification.

CLIFFORD K. MacDONALD.